UNITED STATES PATENT OFFICE 2,441,944

PRODUCTION OF POLYPENTAERYTHRITOLS

John P. Remensnyder, Metuchen, N. J., Philip I. Bowman, Syracuse, N. Y., and Robert H. Barth, Ridgewood, N. J., assignors to Heyden Chemical Corporation, New York, N. Y., a corporation of Delaware No Drawing. Original application April 24, 1943, Serial No. 484,478. Divided and this application April 5, 1947, Serial No. 739,646

5 Claims. (Cl. 260—615)

This invention relates to an improved process for the manufacture of pentaerythritol and polypentaerythritols by the action of acetaldehyde and formaldehyde in the presence of an alkali. This application is a division of our prior application Serial No. 484,478, filed April 24, 1943, which in turn is a continuation in part of application Serial No. 442,620, filed May 12, 1942, by Raymond F. Burghardt and Robert H. Barth, both of which have issued as Patents No. 2,441,597 and 2,401,749 respectively.

It is well known that pentaerythritol and polypentaerythritols are formed by the reaction of 4 to 5 molecules of formaldehyde with 1 molecule of acetaldehyde in the presence of 1 to 1½ equivalents of alkali. Alkalies which have been suggested are the hydroxides of sodium, calcium, potassium and barium, as well as certain carbonates such as those of sodium and potassium. In commercial practice the alkalies most commonly used are sodium hydroxide and calcium hydroxide, although sodium hydroxide has not been used generally, since it has been considered too strong a condensing agent.

In the manufacture of pentaerythritol by the condensation of acetaldehyde and formaldehyde, there are also formed smaller amounts of other hydroxylated substances. One of these, which is obtained in a considerable amount, is dipentaerythritol, which is an ether having the following structure:

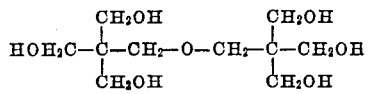

(See Brün, "Ueber den Dipentaerythrit," Wilhelm Greven, Krefeld, 1930). Another hydroxylated substance, which is obtained in somewhat smaller amounts, is white and crystalline, melts at 230–240° C., and has a hydroxyl value of 33%. The chemical structure of this substance is not known, and there is a possibility that it is a mixture of chemical entities. It seems fairly certain, however, that it is related to dipentaerythritol in that it contains pentaerythritol residues bound by ether linkages. Regardless of chemical structure, for purposes of definition in this specification and in the claims, this substance will be termed "pleopentaerythritol." According to the best evidence available, pleopentaerythritol is probably a mixture of dipentaerythritol, tripentaerythritol, and possibly additional related alcohols.

The material referred to as "pleopentaerythritol" was crystallized from 100 times its weight of water. The product obtained is a crude tripentaerythritol. If this is recrystallized twice from water, a pure tripentaerythritol is obtained, which has a melting point of 242–248° C., and the following analysis:

|  | Per cent Calculated | Per cent Found |
|---|---|---|
| Carbon | 48.35 | 47.97 |
| Hydrogen | 8.66 | 8.20 |

The formula would be as follows:

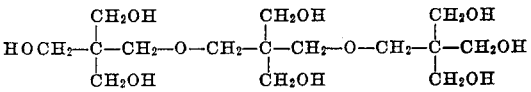

This compound reacts with formaldehyde in the presence of aqueous hydrochloric acid to give a compound, melting point 176–178° C., which corresponds to the following formula and has the following analysis:

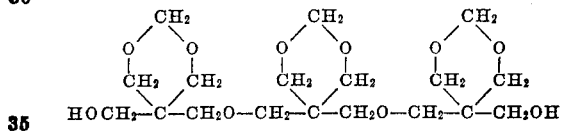

|  | Per cent Calculated | Per cent Found |
|---|---|---|
| Carbon | 52.90 | 54.3 |
| Hydrogen | 7.90 | 7.0 |
| Molecular weight | 408.4 | 413 |

When tripentaerythritol is acetylated with acetic anhydride a compound is obtained having a melting point of 85° C., and which corresponds to the following formula, and has the following analysis:

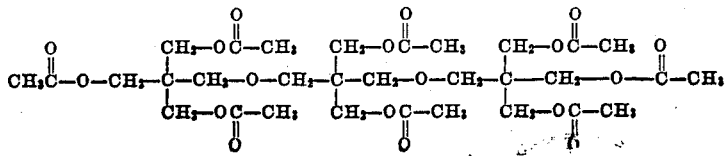

| | Per cent Calculated | Per cent Found |
|---|---|---|
| Carbon | 52.53 | 52.6 |
| Hydrogen | 6.82 | 7.08 |
| Molecular Weight | 708.7 | 704 |
| CC N/1 NaOH consumed per gram in saponification | 11.29 | 11.22 |

Dipentaerythritol, tripentaerythritol, and pleopentaerythritol may be grouped together under the generic term "polypentaerythritols," by which term is meant those compounds having higher molecular weights than pentaerythritol which are formed either actually or theoretically by etherifying one or more of the hydroxyl groups of pentaerythritol with other pentaerythritol residues.

The processes heretofore known for the production of pentaerythritol and polypentaerythritols have always involved the use of dilute alkali and a dilute solution of the two aldehydes. The total concentration of aldehydes has always been less than 20%, usually 10% to 15%. This has been done apparently to avoid side reactions which give syrupy, dark colored products. The reaction temperatures which are reported are within the range from 20° to 50° C.

In application Serial No. 442,620 (Patent No. 2,401,749) are described conditions which increase the yield of solid products, namely pentaerythritol and polypentaerythritols. These conditions include a lowered reaction temperature and a higher concentration of aldehydes. In the process described in the said application special attention was paid to the formation of a high yield of fairly pure pentaerythritol containing a minimum of polypentaerythritols, including about 5-10% dipentaerythritol. This mixture represented about 85-90% of the total products, and the polypentaerythritols accounted for 10-15% when separated in the manner described in the examples.

The main purpose of this invention is to increase the ratio of polypentaerythritols to the pentaerythritol. These polypentaerythritols are very useful in the resin and coating industries. This increase in the proportion of polypentaerythritol is effected not by changing the conditions which were found to be so beneficial in the said application, but by combining those conditions with the discovery that the proportion of polypentaerythritols is increased if pentaerythritol in some form is added to the reaction medium. The pentaerythritol may be added from a previously prepared batch, and may serve as a reactant for the formation of polypentaerythritols. If, however, the conditions of the said copending application are not used, namely, that the temperatures during the addition of the acetaldehyde be between 15° and 30° C., preferably between 20° and 25° C., and the concentration of the formaldehyde solution used be between approximately 20% and approximately 30%, and of the acetaldehyde be 100%, poor total yields of pentaerythritol and dipentaerythritol are obtained, although the ratio of dipentaerythritol to pentaerythritol is increased.

It has been further discovered that addition of the above mixture of aldehydes to a solution of pentaerythritol in 30% aqueous caustic soda (sodium hydroxide) solution caused a remarkable increase in the dipentaerythritol yield. In fact, dipentaerythritol can be made the major product by a proper choice of ratios of reactants. It is not necessary to use pure pentaerythritol, and both crude wet material from commercial evaporators (which may contain a high ash of sodium formate) or a high quality reaction liquor of the type obtained from the process described in the said application, or a mixture, may be utilized.

It has been further discovered that by use of proportions of sodium hydroxide in excess of 1.4 mols per mol of acetaldehyde, preferably 1.7 to 2 mols, it is possible to increase the proportion of tripentaerythritol produced. The use of stronger formaldehyde solutions, up to a concentration of 45% formaldehyde, and the use of higher temperatures, up to approximately 45° C., in completely enclosed reactors is desirable for the purpose of increasing the ratio of polypentaerythritols to monopentaerythritol and in maintaining high yields of condensation products.

The following examples illustrate our invention:

*Example 1.*—To a mixture consisting of 1500 parts of 20% formaldehyde solution (approximately 10 mols) containing 272 parts of monopentaerythritol (approximately 2 mols) and 362 parts of 31% sodium hydroxide solution (approximately 2.8 mols) were added slowly 88 parts of acetaldehyde (approximately 2 mols). The time of addition of the acetaldehyde was 1 hour. The temperature maintained during the addition of the acetaldehyde was 22° C. The mixture was then kept at a temperature of 58° C. for 2 hours, after which time the formaldehyde concentration determined by titration with sodium bisulfite solution corresponded to 0.32% formaldehyde. The mixture was neutralized to a pH of 8 with formic acid, and the specific gravity was adjusted to 1.100 at 25°/25° C. The pleopentaerythritol was filtered off, washed and dried. The filtrate was concentrated to a specific gravity of 1.270 at 25°/25° C. under vacuum, and the crystals of technical pentaerythritol filtered, washed well with methanol, and dried.

The pleopentaerythritol was found to contain 35.4% tripentaerythritol, 25% dipentaerythritol, and 37.6% of monopentaerythritol by fractional crystallization. Upon analysis, the fraction of technical pentaerythritol obtained from the filtrate was found to contain 96.8% monopentaerythritol and 3.2% dipentaerythritol, by fractional crystallization.

The total yield of tripentaerythritol based on the acetaldehyde added was 11.85%; that of dipentaerythritol was 12.8%; and that of monopentaerythritol was 51.5%. The total yield of solids was 76.15%, based on the acetaldehyde, the weight of monopentaerythritol having been corrected for the monopentaerythritol added at the start.

*Example 2.*—To a mixture consisting of 1500 parts of 20% formaldehyde solution (approximately 10 mols), 272 parts of technical pentaerythritol (approximately 2 mols), and 362 parts of 31% sodium hydroxide solution (approximately 2.8 mols) were added slowly 88 parts of acetaldehyde (approximately 2 mols). The time of addition of the acetaldehyde was 1 hour. The temperature maintained during the addition of the acetaldehyde was 22° C. The mixture was kept at a temperature of 58° C. for 2 hours, after which time the formaldehyde concentration determined by titration with sodium bisulfite solution corresponded to 0.05%. The mixture was neutralized to a pH of 8 with formic acid, and the specific gravity was adjusted to 1.100 at 25°/25° C. The pleopentaerythritol was filtered off, washed and dried. The filtrate was concentrated to a specific gravity of 1.270 at 25°/25° C. under vacuum, and the technical pentaerythritol crystals filtered, washed well with methanol, and dried.

The pleopentaerythritol was found to contain 44.4% tripentaerythritol, 34% dipentaerythritol, and 21.6% monopentaerythritol by fractional crystallization. Upon analysis the fraction of technical pentaerythritol obtained from the filtrate was found to contain 90% monopentaerythritol and 10% dipentaerythritol by fractional crystallization.

The yield of tripentaerythritol based on the acetaldehyde added was 9.65%; that of dipentaerythritol was 23.2%; and that of monopentaerythritol was 47.8%. The total yield of solids was 80.65%, based on the acetaldehyde.

This example, which describes a procedure substantially identical with the procedure of Example 1, illustrates the possible variations, in yields, which may be expected in the practice of the process of the invention.

*Comparative Example 1.*—A mixture consisting of 1350 parts of 20% formaldehyde solution (approximately 9 mols), 930 parts of 9.5% acetaldehyde solution (approximately 2 mols), and 358 parts of 29% sodium hydroxide solution (approximately 2.6 mols) was made in one minute. The maximum exothermic reaction temperature reached was 52° C. The mixture was then kept at a temperature of 58° C. for 11 hours. After this time the formaldehyde concentration determined by titration with sodium bisulfite corresponded to 0.32%.

To the above mixture at room temperature were added in one minute another batch of the same reactants in the same amounts, namely, 1350 parts of 20% formaldehyde solution, 930 parts of 9.5% acetaldehyde solution, and 358 parts of 29% sodium hydroxide solution. The maximum exothermic reaction temperature reached was 38° C. The mixture was then kept at a temperature of 58° C. for 12 hours, after which time the formaldehyde concentration determined by titration with sodium bisulfite corresponded to 0.35%.

To the above mixture was again added in one minute another batch of the same reactants in twice the previously used quantities, namely, 2700 parts of 20% formaldehyde solution, 1860 parts of 9.5% acetaldehyde solution, and 716 parts of 29% sodium hydroxide solution. The maximum reaction temperature attained was 45° C. The mixture was then kept at a temperature of 58° C. for 10 hours. After this time the formaldehyde concentration determined by titration with sodium bisulfite solution corresponded to 0.32%. The reaction mixture was then neutralized to a pH of 8 with formic acid. The specific gravity was 1.070 at 25°/25° C. The pleopentaerythritol was filtered off, washed and dried. The filtrate was concentrated to a specific gravity of 1.270 at 25°/25° C. under vacuum, and the crystals filtered, washed well with methanol, and dried.

The yield of monopentaerythritol based on the total acetaldehyde that was added to the reaction mixture was 55%; the yield of dipentaerythritol was 11.2% by fractional crystallization; and that of tripentaerythritol was 6.5%.

Inasmuch as the foregoing description comprises preferred embodiments of the invention it is to be understood that the invention is not limited thereto and that modifications and variations may be made therein in accordance with the principles disclosed without departing substantially from the invention, which is to be limited solely by the scope of the appended claims.

We claim:

1. A process for the production of a polypentaerythritol which comprises the reaction of approximately 1 molecular proportion of acetaldehyde, approximately 4.5 to 5 molecular proportions of formaldehyde, at least 1.4 molecular proportions of sodium hydroxide and approximately 1 molecular proportion of pentaerythritol, and effecting said reaction by gradual addition of all of the specified amount of acetaldehyde to a concentrated aqueous solution consisting of all the other said reactants in the specified amounts, and thereafter recovering the polypentaerythritol from the reaction mixture.

2. A process as defined in claim 1 in which the molecular ratio of sodium hydroxide to acetaldehyde is not less than approximately 1.7 to 1 and not greater than approximately 2.0 to 1.

3. A process as defined in claim 1 in which the molecular ratio of sodium hydroxide to acetaldehyde is not less than approximately 1.7 to 1 and not greater than approximately 2.0 to 1 and the starting formaldehyde concentration is between approximately 40% and approximately 50%.

4. A process as defined in claim 1 in which the temperature during the addition of the acetaldehyde is maintained between approximately 15° C. and approximately 45° C.

5. A process for the production of a polypentaerythritol which comprises the reaction of approximately 1 molecular proportion of acetaldehyde, approximately 5 molecular proportions of formaldehyde, approximately 1.4 molecular proportions of sodium hydroxide and approximately 1 molecular proportion of pentaerythritol, effecting said reaction by gradual addition of all of the specified amount of acetaldehyde to a concentrated aqueous solution consisting of all the other said reactants in the specified amounts while maintaining said reaction mixture at a temperature between approximately 15° C. and approximately 45° C., and thereafter recovering the polypentaerythritol from the reaction mixture.

JOHN P. REMENSNYDER.
PHILIP I. BOWMAN.
ROBERT H. BARTH.

REFERENCES CITED

The following references are of record in the file of this patent:

UNITED STATES PATENTS

| Number | Name | Date |
|---|---|---|
| 2,275,586 | Fitzky | Mar. 10, 1942 |
| 2,325,589 | Bried | Aug. 3, 1943 |
| 2,401,749 | Burghardt et al. | June 11, 1946 |